US012782771B2

(12) United States Patent
Ota et al.

(10) Patent No.: US 12,782,771 B2
(45) Date of Patent: Nov. 3, 2026

(54) LIQUID CRYSTAL DISPLAY DEVICE HAVING LOWER REFLECTION WALL AND UPPER REFLECTION WALL

(71) Applicant: Magnolia White Corporation, Tokyo (JP)

(72) Inventors: Takashi Ota, Tokyo (JP); Michihide Shibata, Tokyo (JP); Toshihiro Yajima, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 100 days.

(21) Appl. No.: 18/888,357

(22) Filed: Sep. 18, 2024

(65) Prior Publication Data

US 2025/0110370 A1 Apr. 3, 2025

(30) Foreign Application Priority Data

Oct. 2, 2023 (JP) ................................ 2023-171174

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133607* (2021.01); *G02F 1/133614* (2021.01)

(58) Field of Classification Search
CPC ......... G02F 1/133605; G02F 1/133603; G02F 1/133607; G02F 1/133614
See application file for complete search history.

(56) References Cited

U.S. PATENT DOCUMENTS

| | | | | |
|---|---|---|---|---|
| 2012/0307489 A1* | 12/2012 | Park | F21V 21/005 | 362/246 |
| 2015/0243206 A1* | 8/2015 | Kurita | H05B 45/22 | 250/208.2 |
| 2020/0013932 A1* | 1/2020 | Moon | H10H 20/854 | |
| 2022/0137281 A1 | 5/2022 | Ota | | |

FOREIGN PATENT DOCUMENTS

JP 2022-074264 A 5/2022

* cited by examiner

*Primary Examiner* — Tracie Y Green
(74) *Attorney, Agent, or Firm* — Michael Best & Friedrich LLP

(57) ABSTRACT

A task of the present invention is to realize a display device with high definition and high contrast by means of local dimming. The configuration is as follows. A liquid crystal display device including a display panel and a back light, the back light having a light source and a group of optical sheets, the light source including a light source substrate and LEDs arranged on the light source substrate, the light source being divided into segments in a plan view, the segment including at least one LED, characterized in that the segment is surrounded by a stacked structure of a lower reflection wall and an upper reflection wall.

8 Claims, 10 Drawing Sheets

LIQUID CRYSTAL DISPLAY DEVICE HAVING LOWER REFLECTION WALL AND UPPER REFLECTION WALL

CLAIM OF PRIORITY

The present application claims priority from Japanese Patent Application JP 2023-171174 filed on Oct. 2, 2023, the content of which is hereby incorporated by reference into this application.

BACKGROUND OF THE INVENTION

(1) Field of the Invention

This invention relates to a display device having a back light, and in particular, to a display device which enables a high contrast screen using local dimming.

(2) Background Technology

In a liquid crystal display device, a thin-film transistor (TFT) substrate on which pixel electrodes, TFTs and the like are formed in matrix form, and an opposing substrate is arranged opposite to the TFT substrate, and a liquid crystal layer is sandwiched between the TFT substrate and the opposing substrate. The image is formed by controlling the transmittance of light by the liquid crystal molecules on a pixel-by-pixel basis.

On the other hand, in an organic light emitting diode (OLED) display device, pixels with light-emitting elements using an OLED layer, driving TFTs, switching TFTs, and the like are formed in a matrix, and an image is formed by controlling the emission intensity of the OLED layer for each pixel. The OLED display devices are self-luminous devices, so that the contrast of the image is excellent.

However, since the size of the pixels can be smaller in a liquid crystal display device, the level of definition is superior in a liquid crystal display. Therefore, local dimming has been developed as a method to improve the contrast of liquid crystal displays. The local dimming method has been developed as a method to improve the contrast of liquid crystal displays.

PRIOR ART DOCUMENT

Patent Document

[Patent Document 1] Japanese Patent Publication 2022-074264

SUMMARY OF THE INVENTION

In display devices for virtual reality (VR) and medical display devices, higher resolution and higher contrast images are required. When local dimming is used in such display devices, more detailed control of local dimming is also required.

In order to perform local dimming more effectively and improve contrast in such display devices, it is necessary, for example, to reduce the area of the segment that is the unit of local dimming and to ensure that light from each segment does not extend to adjacent segments.

If the area of the segment is made small, it becomes difficult to place multiple LEDs on the segment. On the other hand, if only one LED is placed on each segment, uniformity of luminance distribution becomes a problem and the LEDs become visible from the screen side. To counter this, for example, if a diffusion sheet is placed, the light from each segment leaks into the neighboring segment due to the influence of the diffusion sheet.

The task of the present invention is to solve such problems, to perform local dimming effectively and to realize a high-definition, high-contrast screen in a display device with a back light.

The present invention solves the above problem and the main specific means are as follows.

(1) A liquid crystal display device including a display panel and a back light, the back light having a light source and a group of optical sheets the light source including a light source substrate and light emitting diodes arranged on the light source substrate, the light source being divided into the segments in a plan view, the segment including at least one light emitting diode, in which the segment is surrounded by a stacked structure of a lower reflection wall and an upper reflection wall.

(2) The liquid crystal display device according to (1), in which the light emitting diode is covered by a transparent resin.

(3) The liquid crystal display device according to (2), in which a thickness the transparent resin is same as that of the lower reflection wall or thicker than that of the lower reflection wall.

(4) The liquid crystal display device according to (1), in which a width of the lower reflection wall is same or larger than a height of the lower reflection wall.

(5) The liquid crystal display device according to (1), in which a width of the upper reflection wall is same or larger than a height of the upper reflection wall.

(6) The liquid crystal display device according to (1), in which the lower reflection wall and the upper reflection wall are formed from silicone resin which include reflective pigments.

(7) The liquid crystal display device according to (2), in which the transparent resin is formed from silicone resin.

(8) The liquid crystal display device according to (2), in which an optical sheet group is disposed on the upper reflection wall, an area surrounded by the transparent resin, the upper reflection wall, and the optical sheet group is an empty space.

DETAILED DESCRIPTION OF THE PREFERRED EMBODIMENT

The invention is described in detail below using Embodiment.

Embodiment 1

Figure 1:
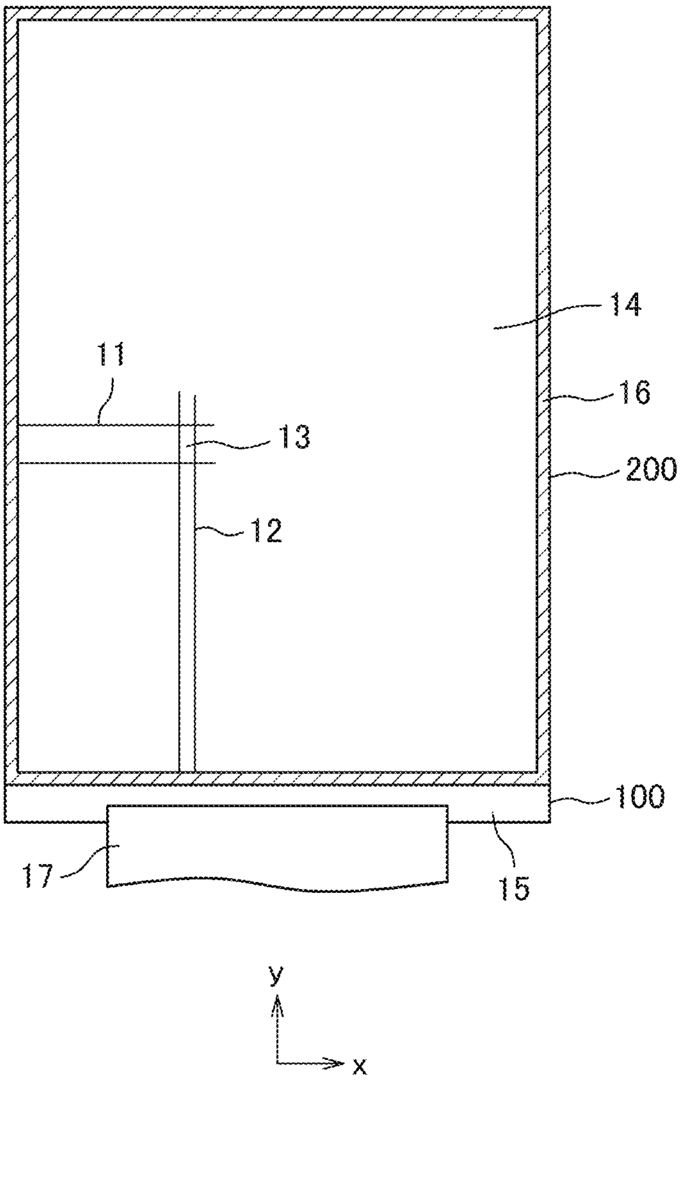
FIG. 1 is a plan view of a liquid crystal display device.

FIG. 1 is a plan view of one example of a liquid crystal display device. In FIG. 1, a TFT substrate 100 and an opposing substrate 200 are bonded by a sealing material 16 and a liquid crystal is sandwiched thereinside; a display area 14 is formed in the overlapped portion of the TFT substrate 100 and the opposing substrate 200. In the display area 14, scanning lines 11 extend in the horizontal direction (x-direction) and are arranged in the vertical direction (y-direction). Video signal lines 12 extend in the vertical direction and are arranged in the horizontal direction. A pixel 13 is formed in the area bounded by the scanning lines 11 and the video signal lines 12.

In FIG. 1, the area where the TFT substrate 100 does not overlap with the opposing substrate 200 is a terminal area 15. A flexible wiring substrate 17 is connected to the terminal area 15 to supply power and signals to the liquid crystal display panel. A driver integrated circuit (driver IC) that drives the liquid crystal display panel is mounted on the flexible wiring substrate 17. On the back of the TFT is arranged a back light as depicted in FIG. 2.

Figure 2:
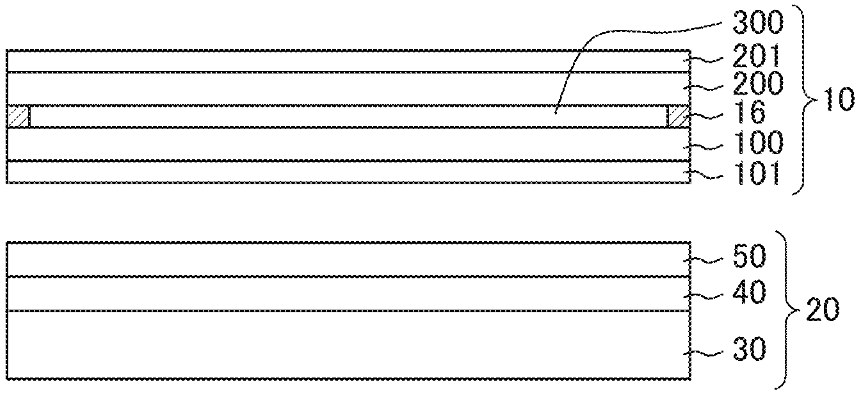
FIG. 2 is a cross-sectional view of the liquid crystal display device.

FIG. 2 depicts a cross-sectional view of the LCD display device. In FIG. 2, a back light 20 is arranged behind a liquid crystal display panel 10. The liquid crystal display panel 10 has the following structure. The TFT substrate 100 on which the pixel electrodes, common electrodes, TFTs, scanning lines, video signal lines, etc. are formed is placed opposite to the opposing substrate 200 on which a black matrix and color filters are formed. The TFT substrate 100 and the opposing substrate 200 are bonded by the sealing material 16 in the periphery, and a liquid crystal 300 is sealed thereinside.

Liquid crystal molecules are initially oriented by an alignment film formed on the TFT substrate 100 and the opposing substrate 200. When voltage is applied between the pixel electrodes and the common electrode, the liquid crystal molecules rotate to form an image by controlling the light from the back light 20 for each pixel. As the liquid crystal 300 can control only the polarized light, a lower polarizing plate 101 is placed under the TFT substrate 100 to allow only the polarized light to enter the liquid crystal layer 300. The light modulated by the liquid crystal 300 is detected by an upper polarizing plate 201 and the image is observed.

In FIG. 2, the back light 20 is arranged behind the liquid crystal display panel. The back light 20 includes a light guide plate 40 arranged over a light source 30 and an optical sheet group 50 arranged over the light guide plate 40. FIG. 2 is an example, for example, the light guide plate 40 is not essential. For example, Embodiment 1 described herein describes an example in which the light guide plate 40 is not used.

The light guide plate 40 in FIG. 2 is formed of a transparent resin and has the role of setting an appropriate distance between the light source 30 and the liquid crystal display panel 10. The light guide plate 40 in FIG. 2 also has the role of reflecting light incident on the light guide plate 40 at the interface, thereby homogenizing the light from the LED, which is a point light source.

The optical sheet group 50 is arranged above the light guide plate 40. Prism sheets, the diffusion sheets and the like are used for the optical sheet group 50. In addition to these, in order to obtain white light using a blue LED or the like as a light source, a color conversion sheet or a sheet using quantum dots, in which a phosphor is dispersed within a resin sheet, may also be used. Deflective and reflective sheets may also be used to improve the efficiency of light utilization from the back light 20. What kind of optical sheet is used, the type of optical sheet used, or the number of such sheets used, is determined depending on the display device.

When displaying an image on a liquid crystal display device, the bright areas allow the light from the back light to be transmitted therethrough and the dark areas block the light from the back light. The contrast of an image is defined by the ratio of bright to dark areas. In liquid crystal display devices, the dark areas are formed by the liquid crystal shielding the light from the back light. However, the shielding of the back light by the liquid crystal is not perfect and some light leaks out. This results in a reduction in contrast.

Figure 3:
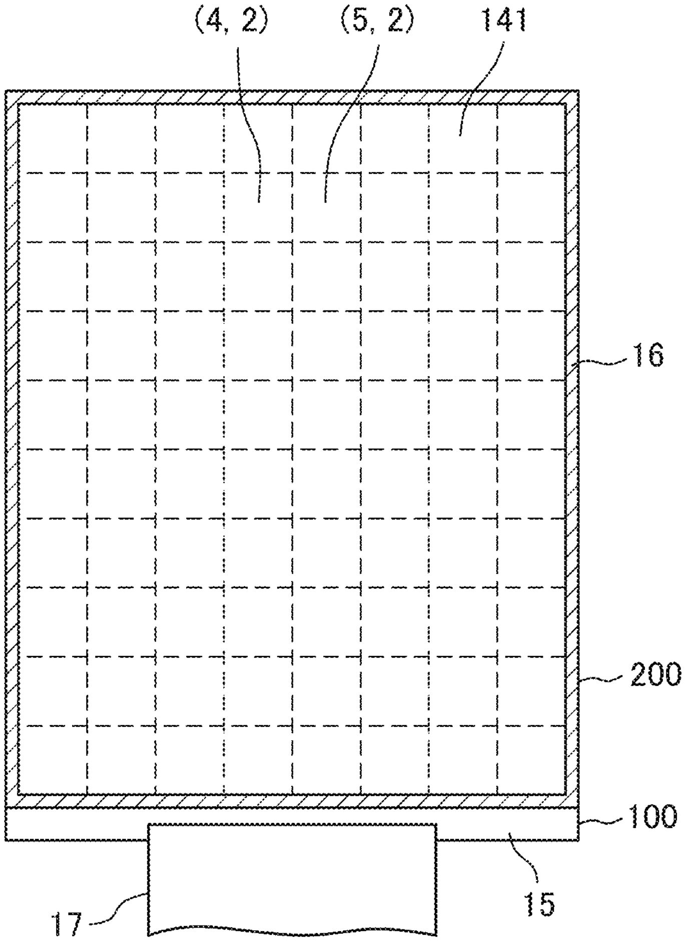
FIG. 3 is a plan view of the liquid crystal display device depicting an example of a segment in the case of local dimming operation in the liquid crystal display.

Local dimming enables deep black display by not illuminating the dark areas with the back light. Therefore, high contrast can be achieved. FIG. 3 depicts an example of a liquid crystal display device depicting a form of local dimming. FIG. 3 depicts a plan view of the liquid crystal display device and the configuration thereof is similar to that described in FIG. 1. In FIG. 3, the display area 14 is divided by segments 141. The dotted lines in FIG. 3 are the boundaries of the segments 141, which are described for convenience, however, the liquid crystal display panel does not have such boundaries. The light source in the back light is located at a position corresponding to each segment.

In FIG. 3, the segment (4, 2) is the bright area and the segment (5, 2) is the dark area. In local dimming, the light source, i.e. the LED, in the segment (4, 2) is switched on and the light source, i.e. the LED, in the segment (5, 2) is not switched on. The black formed in the part of the segment (5, 2) will then be a deep black display and a high contrast will be achieved.

However, as there are no boundaries between the segments, the light from the segment (4, 2) may extend to the segment (5, 2), depending, for example, on the luminance distribution of the segments. If this is the case, the back light will also illuminate the segment (5, 2), which is supposed to display black, and the effect of local dimming will not be fully realized.

Figure 4:
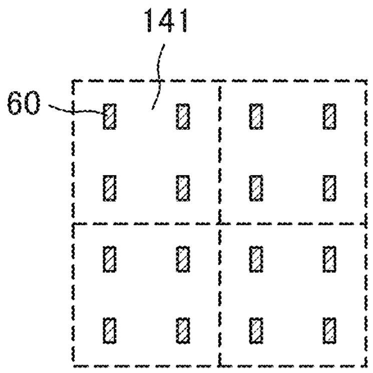
FIG. 4 is a plan view of Comparative Example 1 when four LEDs are placed on a segment.
Figure 5:
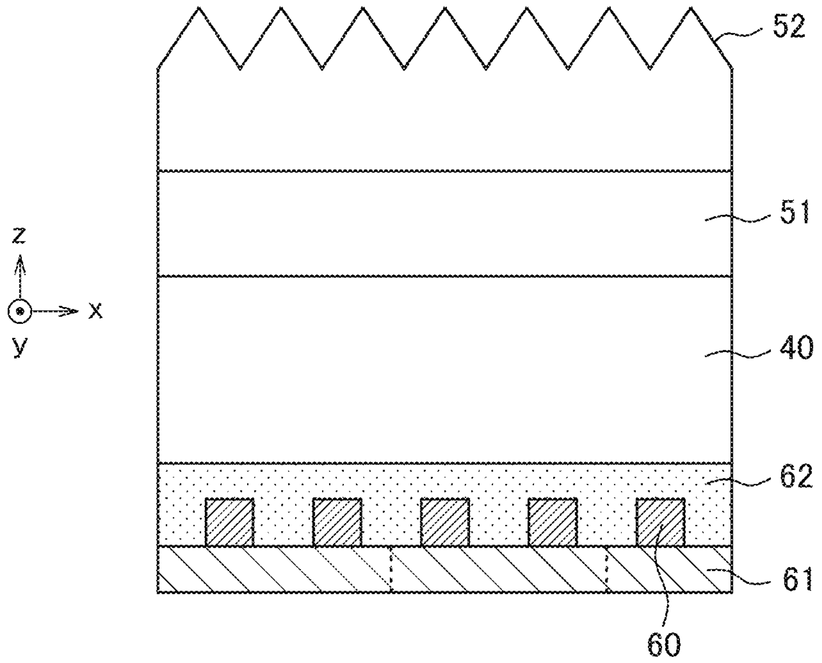
FIG. 5 is a cross-sectional view of Comparative Example 1 when four LEDs are arranged in a segment.

FIGS. 4 and 5 depict Comparative Examples of back light configurations to reduce such problems. FIG. 4 depicts a plan view of the arrangement of an LED 60, the light source, in each segment 141 in the back light. The light source is hereafter represented as the LED 60. In FIG. 4, each segment 141 is separated by a dotted line. However, this dotted line is for convenience only and is not an actual partition. The size of each segment is less than 4 mm sq, e.g. 2 mm sq in the case of FIG. 5. The same applies to the size of the segment 141 in the following examples.

In FIG. 4, four 60 LEDs are arranged in each segment 141. In other words, by placing the four LEDs 60 in the segment 141, the luminance of each LED can be reduced. As a result, the amount of light leaking into the neighboring segments can also be reduced.

FIG. 5 depicts a cross-sectional view of the back light in Comparative Example 1. In FIG. 5, the LED 60 is arranged on a light source substrate 61 and a transparent resin 62 is formed over the LED 60. Blue LEDs are used for the LED 60. Acrylic or silicone resin is used for the transparent resin 62, for example. The transparent resin 62 is used to protect the LED 60 and the electrodes and wirings formed on the light source substrate 61. The dotted lines on the light source substrate 61 in FIG. 5 indicate segment boundaries for convenience.

The light guide plate 40 is placed on top of the transparent resin 62. The light guide plate 40 is transparent, but reflects the light incident on the light guide plate 40 at the interface to even out the light from the LED 60. A color conversion sheet 51 is placed over the light guide plate 40. The color conversion sheet 51 is a transparent resin sheet dispersed with phosphors that emit yellow light upon receiving blue light, and the light that passes through the color conversion sheet 51 is white light. The thickness of the color conversion sheet 51 is, for example, between 50 and 70 microns.

A prism sheet 52 is arranged above the color conversion sheet 51. The prism sheet 52 consists of prisms with a triangular cross-sectional shape extending in the y-direction and arranged in the x-direction. The role of the prism sheet 52 is to increase the light utilization efficiency by directing the light emitted from the main surface of the color conversion sheet 51 in an oblique direction at right angles to the main surface of the color conversion sheet 51. In FIG. 5, there is one prism sheet 52, but a prism sheet with a prism array extending perpendicularly to the prism array of the prism sheet 52 in FIG. 5 may be added. The thickness of the prism sheet is, for example, 50 microns for the prism array part (i.e. the prism height) and 70 microns for the base material part, for a total thickness of about 120 microns.

In the configuration of FIGS. 4 and 5, four LEDs 60 are arranged per segment. Therefore, the luminance of each LED 60 can be reduced, so that the light leakage to the adjacent segments can be reduced. However, arranging four LED 60s per segment can be a cost problem. Also, when the segment size is smaller, placing multiple LEDs in each segment may be problematic in terms of space.

Figure 6:
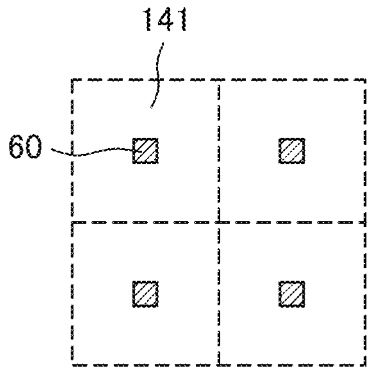
FIG. 6 is a plan view of Comparative Example 2 when one LED is placed on a segment.
Figure 7:
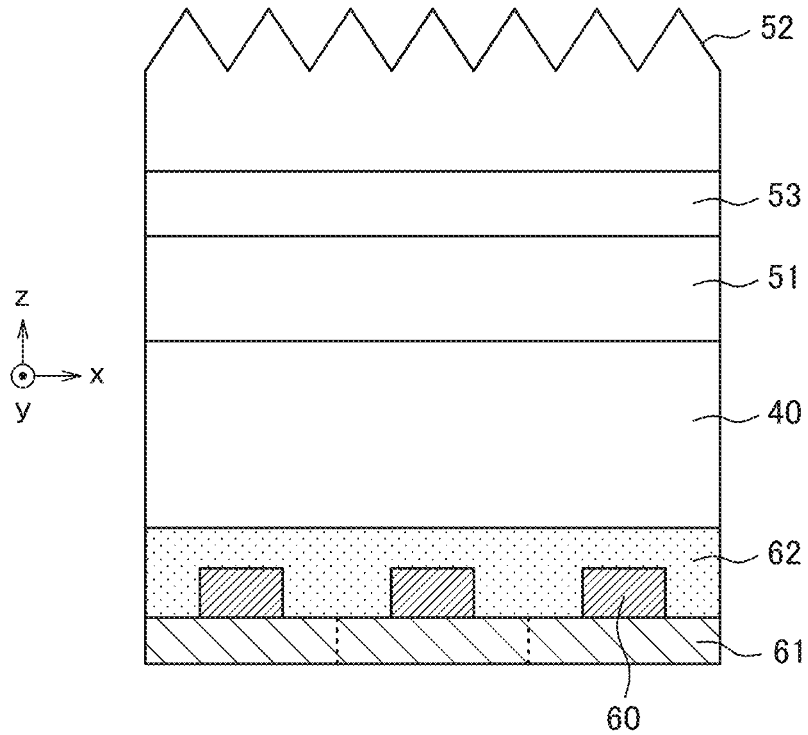
FIG. 7 is a cross-sectional view of Comparative Example 2 when one LED is placed on a segment.

FIGS. 6 and 7 depict Comparative Example 2 when one LED 60 is placed in each segment 141. FIG. 6 depicts a plan view of the arrangement of the LED 60, the light source, in each segment 141 in the back light. In FIG. 6, each segment 141 is partitioned by a dotted line. However, the dotted lines are only imaginary for convenience and are not actual partitions.

In FIG. 6, one LED 60 is placed in each segment 141; since one LED 60 covers the luminance of the entire segment 141, the luminance of the LED 60 is much greater than that in Comparative Example 1. If the luminance of the LED 60, which is a point light source, is large, when viewed from the screen side, areas of high luminance are produced in the area corresponding to the LED. To counter this, it is necessary to place a diffusion sheet 53 in the optical sheet group 50, as will be explained later.

FIG. 7 depicts a cross-sectional view of the back light in Comparative Example 2. In FIG. 7, the LED 60 is arranged on the light source substrate 61 and the transparent resin 62 is formed over the LED 60. The configuration of the light source is the same as that in FIG. 5, except that there is only one LED 60 per segment.

The light guide plate 40 is placed on top of the transparent resin 62. The role of the light guide plate 40 is the same as that described in Comparative Example 1. A color conversion sheet 51 is arranged on the light guide plate 40. The role of the color conversion sheet 51 is the same as that described in Comparative Example 1. In FIG. 7, the diffusion sheet 53 is arranged above the color conversion sheet 51. The diffusion sheet 53 is used to diffuse the light from the light source 60 to make the luminance uniform. A thickness of the diffusion sheet 53 is, for example, 50 to 70 microns.

In other words, as there is only one LED 60 in the segment 141, the luminance of the LED 60 needs to be increased in order to provide the sufficient light to the entire segment 141. In this way, the part of the screen corresponding to the LED 60 appears to glow like a dot. The area that appears to glow in the shape of a dot is sometimes referred to as the bright spot. The role of the diffusion sheet 53 is to diffuse the light so that the bright spots corresponding to the LED 60 are not visible.

However, since the diffusion sheet 53 diffuses the light, it also diffuses the light from the LED 60 to the adjacent segments. In other words, the configuration of FIG. 7 has the problem that the light from the LED 60 leaks into the adjacent segments not only through the transparent resin 62 covering the LED 60, the light guide plate 40 and the color conversion sheet 51, but also through the diffusion sheet 53. The configuration and action of the prism sheet in FIG. 7 is similar to that described in FIG. 5.

Figure 8:
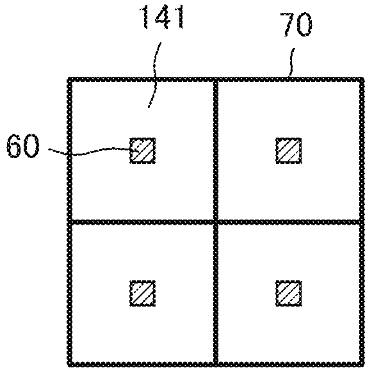
FIG. 8 is a plan view of the segment of Comparative Example 3.
Figure 9:
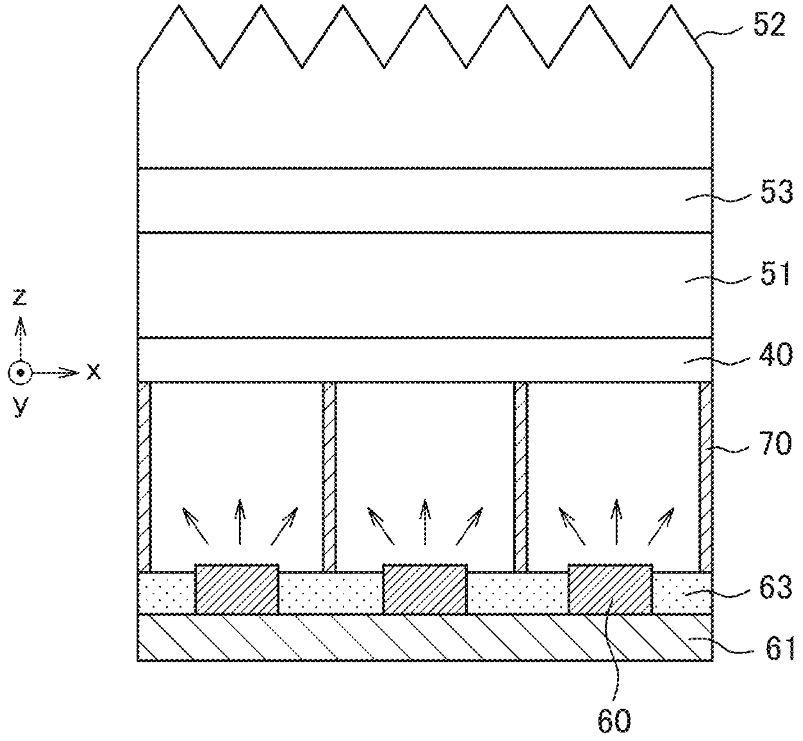
FIG. 9 is a cross-sectional view of the segment of Comparative Example 3.

FIGS. 8 and 9 depict the configuration of the back light according to Comparative Example 3. FIG. 8 depicts a plan view of the arrangement of the LED 60, which is the light source, in each segment 141 in the back light. In Comparative Example 3, the LED 60 is also a blue LED. In FIG. 8, each segment 141 is partitioned by a partition plate 70. The partition plate 70 is made of thin sheets of resin assembled in a in parallel crosses. The size of each segment 141 is less than 4 mm sq, e.g. 2 mm sq.

In FIG. 8, one LED 60 is arranged in each segment 141. Therefore, although the luminance of the LED 60 is large, in the configuration of Comparative Example 3, the luminance can be smaller than the luminance of the LED in the case of Comparative Example 2, because the amount of light leaking out from the LED 60 into the adjacent segments is small, as will be explained later.

FIG. 9 depicts a cross-sectional view of the back light in Comparative Example 3. In FIG. 9, the LED 60 is arranged on the light source substrate 61. In FIG. 9, a protective film 63 is formed over the wirings and electrodes formed on the light source substrate 61. This configuration differs significantly from Comparative Examples 1 and 2. In other words, in the configuration of Comparative Example 3, the LED 60 is not covered by the transparent resin 62 and the light emitting area of the light emitted from the LED 60 is above the protective film 63. Therefore, the protective film 63 need not be transparent. In other words, in Comparative Example 3, the transparent resin 62 in Comparative Examples 1 and 2 is not present.

In the configuration of FIG. 9, the protective film 63 should be made of a white resin, for example, with a high reflectivity. Such a resin can be formed, for example, from silicone resin. In other words, the light emitted from the LED 60 is partly reflected by the partition plate 70 and the light guide plate 40 and enters the protective film 63 side, but if the reflectivity of the protective film 63 is high, this light can be reflected again and directed towards the liquid crystal display panel.

In FIG. 9, the partition plate 70 is present at the boundary of the segments, and this partition plate 70 is placed on the protective film 63. The partition plate 70 is made of white polyethylene terephthalate (PET); the light emitted from the LED 60 in an oblique direction is reflected by the partition plate 70 and directed towards the light guide plate 40. The transparent light guide plate 40 is placed above the partition plate 70. The light incident on the light guide plate 40 is reflected in the light guide plate 40, reducing uneven brightness due to the presence of the partition plate 70.

In Comparative Examples 1 and 2, the light from the LED 60 leaks through the transparent resin 62 covering the LED to the adjacent segments, but in Comparative Example 3, as depicted in FIG. 9, the light emitted from the LED 60 is reflected by the partition plate 70 and does not leak to the adjacent segments.

In FIG. 9, a color conversion sheet 51 is arranged on the light guide plate 40. The configuration and action of the color conversion sheet 51 is similar to that described in Comparative Example 1. The diffusion sheet 53 is arranged above the color conversion sheet 51. The role of the diffusion sheet 53 is to make the bright spots caused by the LED 60 invisible from the screen side. However, the light from the LED 60 is diffused by the diffusion sheet 53, so that this diffused light leaks into the adjacent segments. By the way, in FIG. 9, the light leakage to the neighboring segments is prevented by the dividing plate 70, so that the intensity of the light from the LED 60 can be reduced, which in turn reduces the effect of the light diffused by the diffusion sheet 53 on the neighboring segments.

In FIG. 9, the prism sheet 52 is arranged above the diffusion sheet 53, as in Comparative Examples 1 and 2. The configuration and action of the prism sheet 52 is also the same as that described in Comparative Examples 1 and 2. The optical sheet group in FIG. 9 is an example and other optical sheets may be used.

The partition plate 70 is a combination of white PET plates of about 0.2 mm thickness in a parallel crosses shape. The segments 141 are formed in the area enclosed by the partition plate 70. The size of the segment 141 is, for example, 2 mm square and the height of the partition plate 70 is, for example, 1 mm.

The issue in Comparative Example 3 is that the parallel crosses shaped partition plate 70 is required. This means that the cost of manufacturing the partition plate and the cost of installing the partition plate are required.

Figure 10:
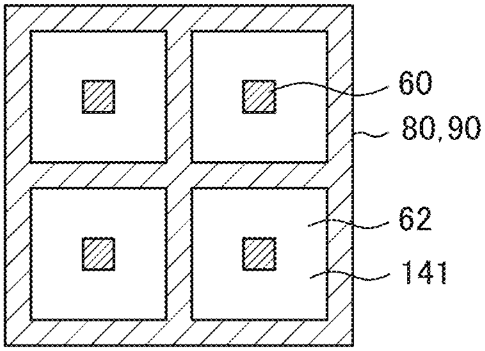
FIG. 10 is a plan view depicting a segment of Embodiment 1.
Figure 11:
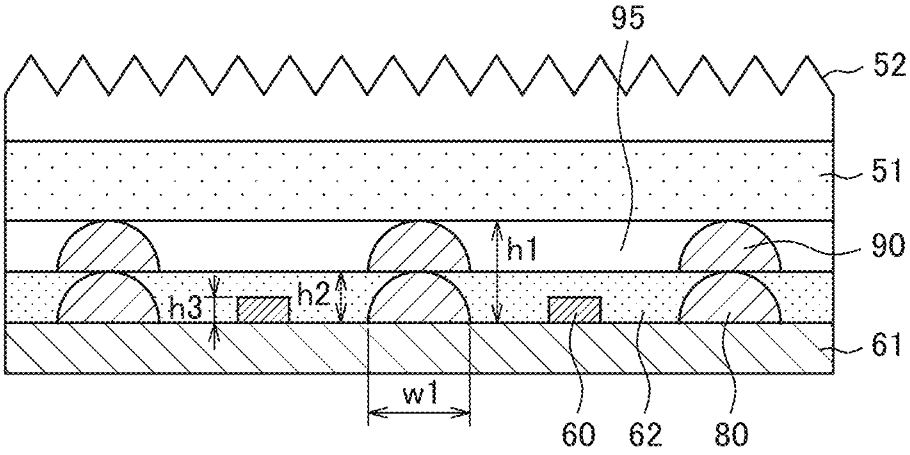
FIG. 11 is a cross-sectional view depicting the segment of Embodiment 1.

FIGS. 10 and 11 depict the back light according to Embodiment 1. FIG. 10 depicts a plan view of the arrangement of the LED 60, which is the light source, in each segment 141 in the back light. In this Embodiment, the LED 60 is a blue LED. In FIG. 10, each segment 141 is partitioned by a lower reflection wall 80 and an upper reflection wall 90, which are stacked in two levels. The size of each segment 141 is less than 4 mm sq, e.g. 2 mm sq.

In FIG. 10, one LED 60 is placed in each segment 141. Therefore, although the luminance of the LED 60 is large, in the configuration of Embodiment 1, the amount of light leaking out from the LED 60 into the neighboring segments is small, as will be explained later, and the luminance can therefore be smaller than the luminance of the LED in the case of Comparative Example 2.

FIG. 11 depicts a cross-sectional view of the back light in Embodiment 1. Each segment is partitioned by the lower reflection wall 80. In FIG. 11, within each segment, the LED 60 is arranged on the light source substrate 61. The transparent resin 62 is formed over the LED 60, wirings, electrodes, etc.

In FIG. 11, the transparent resin 62 is formed over the LED 60, wirings, electrodes, etc. formed on the light source substrate 61. The transparent resin 62 also covers the side surface of the lower reflection wall 80, but the transparent resin 62 is almost the same as the top surface of the lower reflection wall 80. The upper reflection wall 90 is superimposed on the lower reflection wall 80. The stacked structure of the lower reflection wall 80 and the upper reflection wall 90 serves as a partition between the segments.

For example, the silicone resin is used for the transparent resin 62. The lower reflection wall 80 and the upper reflection wall 90, which are used as partitions, are formed of the silicone resin containing reflective white pigment.

In FIG. 11, a color conversion sheet 51 is placed over the upper reflection wall 90. The configuration and action of the color conversion sheet 51 is similar to that described in Comparative Example 1. The area surrounded by the upper reflection wall 90, the transparent resin 62 and the color conversion sheet 51 is a space: the light emitted from the LED 60 is reflected by the lower reflection wall 80 and the like in the transparent resin 62, or is refracted or reflected at the interface between the transparent resin 62 and the space 95, and the light emitted from the transparent resin 62 is directed in a variety of directions.

The light entering the space 95 is partly reflected by the upper reflection wall 90, and furthermore, reflection or refraction is produced at the interface between the space 95 and the color conversion sheet 51, resulting in the light being mixed more and the light going in various directions. Therefore, the light guide plate 40 used in Comparative Examples 1 to 3 is not used in FIG. 11. The distance between the light source, the LED 60, and the LCD panel 10 can also be adjusted by changing the height of the lower reflection wall 80 or the upper reflection wall 90. However, in this Embodiment, the light guide plate 40 may also be used if necessary.

In FIG. 11, the prism sheet 52 is placed on top of the color conversion sheet 51. The role of the prism sheet 52 is as described in Comparative Example 1 and other examples. In FIG. 11, no diffusion sheet is used. This is because in the configuration of FIG. 11, the light leakage to the adjacent segments can be reduced by the action of the lower reflection wall 80 and the upper reflection wall 90, so that the light output of the LED 60 can be reduced compared to Comparative Example 2, etc. However, the diffusion sheets can also be used if necessary. In the configuration of FIG. 11, the light intensity of the LED 60 can be reduced, so that, even if the diffusion sheet is used, the effect of this on the adjacent segments can be kept small.

A feature of FIG. 11 is that the partition between the segments is formed by a two-layer structure with the lower reflection wall 80 and the upper reflection wall 90. In FIG. 11, the thickness h2 of the transparent resin 62 is greater than the height h3 of the LED 60. The lower reflection wall 80 reflects the light from the LED 60 that is directed towards the adjacent segment in the transparent resin 62. The upper reflection wall 90 reflects the light trying to be directed towards the adjacent segment in the space 95. Thus, the configuration of FIG. 11 can efficiently prevent the light leakage to the adjacent segment.

Figure 12:
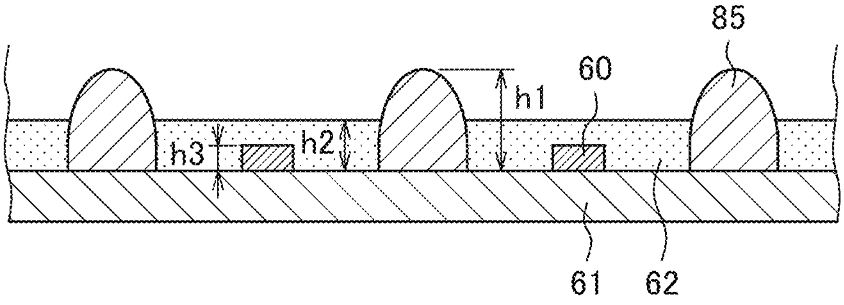
FIG. 12 is a cross-sectional view depicting another structure to produce the effect of Embodiment 1.

A configuration that can have a similar action to that of FIG. 11 is depicted in FIG. 12. FIG. 12 depicts a configuration in which the partition between the segments consists of only one level of reflection wall 85. The other configuration is the same as that in FIG. 11. By the way, in this configuration of the present Embodiment, it is important to accurately set the height h1 of the reflection wall 85 and the thickness h2 of the transparent resin 62 in order to obtain certain optical properties. However, as both the transparent resin 62 and the reflection wall 85 are resins, it is difficult to set the dimensions as depicted in FIG. 12 accurately in the process. Accurately achieving a configuration such as that in FIG. 12 requires precise process control, which ultimately increases manufacturing costs.

In Embodiment 1 of the present invention, by forming the segment partition by stacking the lower reflection wall 80 and the upper reflection wall 90, the required dimensions, i.e. the height of the lower reflection wall 80 and the upper reflection wall 90 and the thickness of the transparent resin 62, can be set consistently and accurately without the need for a complex process. FIGS. 13 to 19 depict examples of processes for realizing the configuration of the light source of Embodiment 1. In FIGS. 13 to 19, the LED 60 is omitted.

Figure 13:
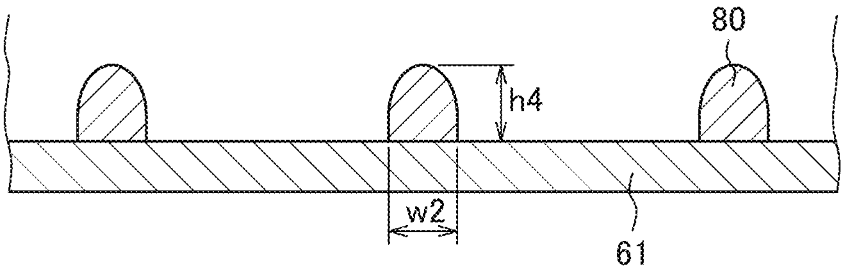
FIG. 13 is a cross-sectional view depicting the first process for realizing the structure of Embodiment 1.

FIG. 13 depicts the first process, where the lower reflection wall 80 is applied to the light source substrate 61 by screen printing or dispensing. The height h4 of the lower reflection wall 80 at this time is greater than the height h2 depicted in FIG. 11. The width w2 of the lower reflection wall 80 at this time is smaller than the width w1 of the lower reflection wall 80 depicted in FIG. 11. The dimensions are designed to accommodate the compression process that will take place later in the process. After the lower reflection wall 80 is applied, it is dried and provisionally cured.

Figure 14:
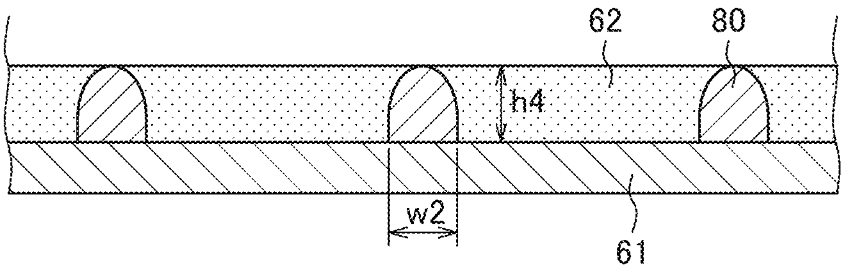
FIG. 14 is a cross-sectional view depicting the second process.

FIG. 14 depicts the second process, where the transparent resin is poured into each segment. The transparent resin is levelled so that the surface is approximately aligned with the lower reflection wall 80 after drying, by controlling the viscosity appropriately. The transparent resin 62 is then dried and provisionally cured. In this state, the height of the lower reflection wall 80 and the thickness of the transparent resin 62 are h4 and the width of the lower reflection wall 80 is w2.

Figure 15:
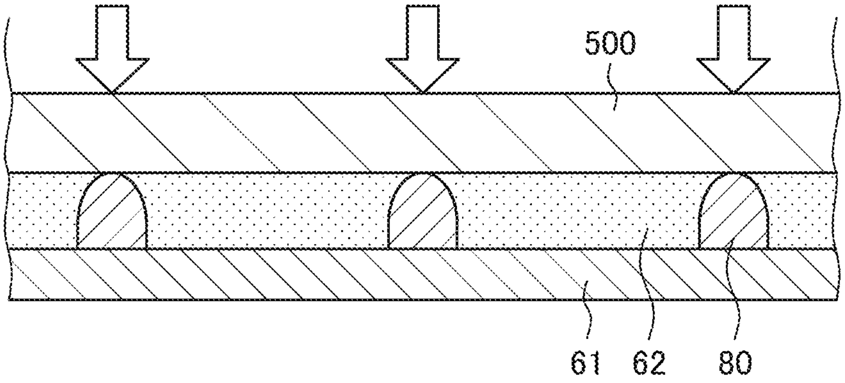
FIG. 15 is a cross-sectional view depicting the third process.
Figure 16:
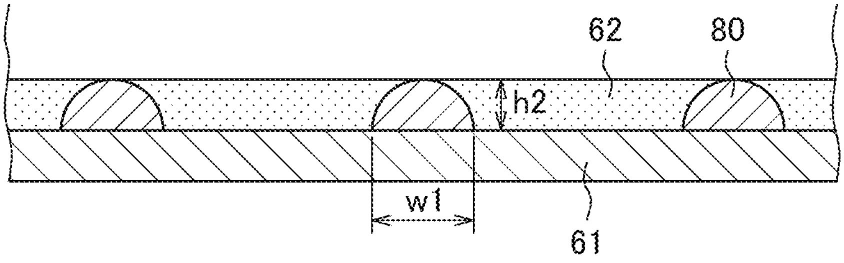
FIG. 16 is a cross-sectional view depicting the fourth process.

FIG. 15 is a third process and is a cross-sectional view depicting the state in which a pressure is applied from above with the pressure plate 500 to the lower reflection wall 80 and the transparent resin 62. In the state depicted in FIG. 15, the lower reflection wall 80 and the transparent resin 62 are still in a state of temporary hardening, so that, when the pressure is applied, the thickness decreases. However, the width of the lower reflection wall 80 increases as the pressure is applied. FIG. 16 depicts the fourth process, a cross-sectional view of the state after the lower reflection wall 80 and the transparent resin 62 are pressed by the pressure plate 500. In this state, baking is carried out and the lower reflection wall 80 and the transparent resin 62 are thermally cured. After the heat curing is finished, the height h2 and the width w1 of the lower reflection wall 80 and the thickness h2 of the transparent resin 62 are the same as in the state in FIG. 11.

Figure 17:
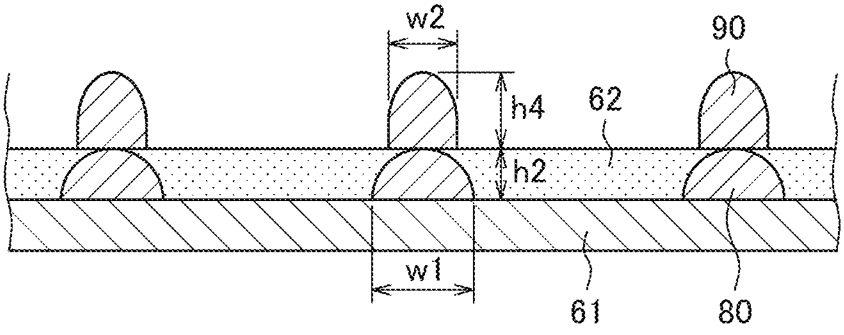
FIG. 17 is a cross-sectional view depicting the fifth process.

FIG. 17 is a fifth process and a cross-sectional view depicting the state in which the upper reflection wall 90 is applied over the cured lower reflection wall 80 by screen printing or dispensing. The shape of the upper reflection wall 90 in FIG. 17 is the same as the shape of the lower reflection wall 80 in FIG. 13. In the state depicted in FIG. 17, the upper reflection wall 90 is dried and provisionally cured.

Figure 18:
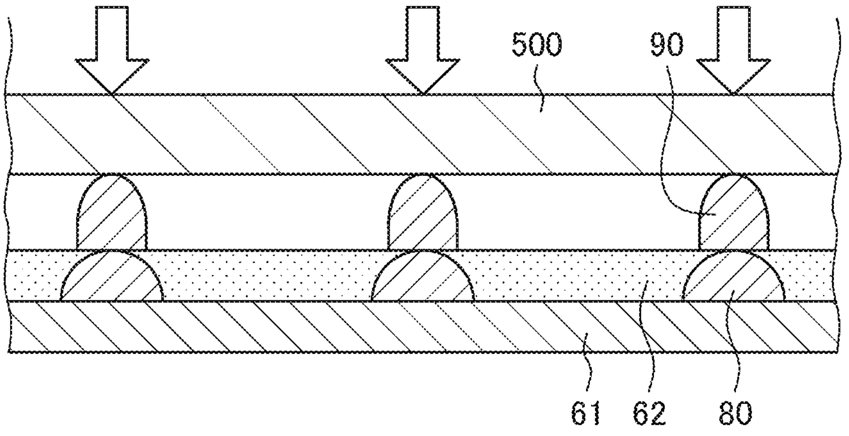
FIG. 18 is a cross-sectional view depicting the sixth process.

FIG. 18 is the sixth process, where a pressure is applied by the pressure plate 500 to the upper reflection wall 90 in the provisionally cured state. At this time, the lower reflection wall 80 and the transparent resin 62 are completely solidified, so that their height remains the same and only the upper reflection wall 90 in a provisionally cured state is pressed. As a result, the height of the upper reflection wall 90 is reduced.

Figure 19:
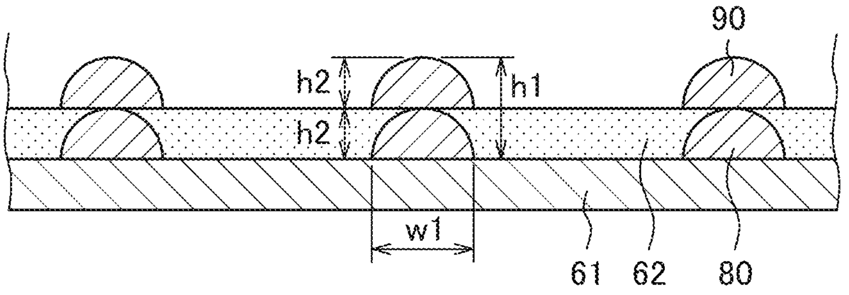
FIG. 19 is a cross-sectional view depicting the seventh process.

FIG. 19 depicts the seventh process, a cross-sectional view of the upper reflection wall 90 in a thermoset state after it has been pressed to a predetermined dimension. This means that the lower reflection wall 80, the transparent resin 62 and the upper reflection wall 90 have all finished curing and are now in a stable shape. The state of the lower reflection wall 80, the transparent resin 62 and the upper reflection wall 90 in FIG. 19 is the same as that in FIG. 11.

In the above process, the lower reflection wall 80 and the transparent resin 62 in a temporarily cured state are compressed with a pressure plate to define the dimensions, so that the thickness or the height can be defined accurately and reproducibly. In FIG. 19, the dimensions of both the lower reflection wall 80 and the upper reflection wall 90 are defined by pressing them with the pressure plate 500. When pressing, the height of both the lower reflection wall 80 and the upper reflection wall 90 is reduced from h4 to h2 and the width is increased from w2 to w1. As a result, the width w1 is often larger than the height h2 in the lower or upper reflection wall 80 or 90.

By way of example, when the transparent resin 62 is applied in FIG. 14, if the viscosity of the transparent resin 62 is high, the thickness of the transparent resin 62 may slightly exceed the height of the lower reflection wall 80. In this case, a small gap is created between the lower reflection wall 80 and the upper reflection wall 90, but in this gap, the upper reflection wall 90 of the width w1 is placed on the upper side, so that it is unlikely to become a major light leakage problem.

In the above description, the height and the width of the lower reflection wall 80 and the upper reflection wall 90 have been described as being the same, but this is not limited to this, and if necessary, the height of one of them may be higher than that of the other.

In this Embodiment, the height of the lower reflection wall 80 and the thickness h4 of the transparent resin 62 have been reduced to the height and the thickness h2 after compression by applying a pressure from above by the pressure plate 500 in the third process, but the height of the lower reflection wall 80 and the thickness of the transparent resin may be created in the first and second processes at h2 each. In this case, in the third process, the pressure by the pressure plate 500 is just enough to flatten the surface of the transparent resin 62.

As described above, by using the present invention, the local dimming can be effectively performed and a high-contrast liquid crystal display device can be manufactured.

What is claimed is:

1. A liquid crystal display device including a display panel and a back light, the back light having a light source and a group of optical sheets, the light source including a light source substrate and light emitting diodes arranged on the light source substrate, the light source being divided into segments in a plan view, the segment including at least one light emitting diode, wherein the segment is surrounded by a stacked structure of a lower reflection wall and an upper reflection wall, the light emitting diode and the lower reflection wall are covered by a transparent resin, the upper reflection wall is arranged on the transparent resin and the lower reflection wall, overlapped the lower reflection wall in plan view, the group of optical sheets is disposed on the upper reflection wall, and an area surrounded by the transparent resin, the upper reflection wall, and the group of optical sheets is an empty space.

2. The liquid crystal display device according to claim 1, wherein a thickness of the transparent resin is same as that of the lower reflection wall or thicker than that of the lower reflection wall.

3. The liquid crystal display device according to claim 1, wherein a width of the lower reflection wall is same or larger than a height of the lower reflection wall.

4. The liquid crystal display device according to claim 1, wherein a width of the upper reflection wall is same or larger than a height of the upper reflection wall.

5. The liquid crystal display device according to claim 1, wherein the lower reflection wall and the upper reflection wall are formed from silicone resin containing reflective pigments.

6. The liquid crystal display device according to claim 1, wherein the transparent resin is formed from silicone resin.

7. The liquid crystal display device according to claim 1, wherein the group of optical sheets includes a color conversion sheet.

8. The liquid crystal display device according to claim 1, wherein the group of optical sheets includes a prism sheet.

* * * * *